(12) United States Patent
Dietz et al.

(10) Patent No.: US 11,904,721 B2
(45) Date of Patent: Feb. 20, 2024

(54) METHOD AND SYSTEM FOR MANAGING AUTHORIZATION CREDENTIALS FOR AN ELECTRICAL CHARGING PROCESS FOR A MOTOR VEHICLE AND SERVER DEVICE

(71) Applicant: AUDI AG, Ingolstadt (DE)

(72) Inventors: Marcel Dietz, Ingolstadt (DE); Veit Rohrberg, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 412 days.

(21) Appl. No.: 17/176,432

(22) Filed: Feb. 16, 2021

(65) Prior Publication Data

US 2021/0291676 A1     Sep. 23, 2021

(30) Foreign Application Priority Data

Mar. 18, 2020   (DE) .......................... 102020107365.8

(51) Int. Cl.
*B60L 53/66*     (2019.01)
*B60L 53/30*     (2019.01)
(Continued)

(52) U.S. Cl.
CPC ............. *B60L 53/665* (2019.02); *B60L 53/30* (2019.02); *B60L 53/66* (2019.02); *B60L 53/68* (2019.02);
(Continued)

(58) Field of Classification Search
CPC ........ B60L 53/665; B60L 53/30; B60L 53/66; B60L 53/68; B60L 53/60; G06Q 20/02;
(Continued)

(56) References Cited

U.S. PATENT DOCUMENTS 9,300,152 B2 *   3/2016   Juhasz ..................... B60L 53/63
9,779,564 B2 *  10/2017   Nagel ................ G07C 9/00309
(Continued)

FOREIGN PATENT DOCUMENTS

CA       3059640 A1 * 10/2018    ............ B60L 53/305
CA       3059638 A1 * 11/2018    .............. B60L 53/14
(Continued)

OTHER PUBLICATIONS

Office Action dated Aug. 1, 2023, in corresponding Japanese Application No. 202110285994.6, 14 pages.

*Primary Examiner* — Richard Isla
*Assistant Examiner* — Manuel Hernandez
(74) *Attorney, Agent, or Firm* — Maier & Maier, PLLC (57) ABSTRACT

A method for activating an electrical charging process between an electric vehicle and a charging station. The certificate data for activating the charging process are stored in a server device by an operating device of a user distinct from the motor vehicle, and the operating device transfers the certificate data to a data memory assigned to the motor vehicle in the server device, by a predetermined transfer command, and, before or while the motor vehicle is connected to the charging station for the charging process, a control unit of the motor vehicle sends out access data for accessing the data memory to an activation circuit of the charging station and the activation circuit requests the certificate data from the data memory of the motor vehicle at the server device based on the access data and, if the requested certificate data meet a predetermined permissibility criterion, carries out the charging process.

13 Claims, 3 Drawing Sheets

(51) Int. Cl.
| | |
|---|---|
| *G06Q 50/06* | (2012.01) |
| *G06Q 20/14* | (2012.01) |
| *G06Q 20/02* | (2012.01) |
| *G06Q 20/38* | (2012.01) |
| *G06Q 20/40* | (2012.01) |
| *B60L 53/68* | (2019.01) |
| *H02J 7/00* | (2006.01) |
| *B60L 53/60* | (2019.01) |

(52) U.S. Cl.
CPC ........... *G06Q 20/02* (2013.01); *G06Q 20/145* (2013.01); *G06Q 20/38215* (2013.01); *G06Q 20/409* (2013.01); *G06Q 50/06* (2013.01); *H02J 7/00045* (2020.01); *B60L 53/60* (2019.02)

(58) Field of Classification Search
CPC ........... G06Q 20/145; G06Q 20/38215; G06Q 20/409; G06Q 50/06; H02J 7/00045
USPC ........................................ 320/109
See application file for complete search history.

(56) References Cited

U.S. PATENT DOCUMENTS

| | | | | |
|---|---|---|---|---|
| 10,803,440 | B1* | 10/2020 | Gaudin | G06Q 20/3226 |
| 11,305,660 | B2* | 4/2022 | Stöcker | B60L 53/65 |
| 2012/0109401 | A1* | 5/2012 | Shelton | H02J 7/0014 |
| | | | | 700/297 |
| 2012/0191242 | A1* | 7/2012 | Outwater | H04L 63/0823 |
| | | | | 700/236 |
| 2013/0099744 | A1* | 4/2013 | Falk | H04L 9/3263 |
| | | | | 320/109 |
| 2015/0032661 | A1* | 1/2015 | Manfield | G06Q 50/30 |
| | | | | 705/347 |
| 2015/0095233 | A1* | 4/2015 | Wild | G06Q 20/40 |
| | | | | 705/44 |
| 2015/0130630 | A1* | 5/2015 | Outwater | G06Q 30/06 |
| | | | | 340/870.02 |
| 2016/0171477 | A1* | 6/2016 | Elder | G06Q 20/3224 |
| | | | | 705/44 |
| 2018/0190051 | A1* | 7/2018 | Outwater | H04L 9/3263 |
| 2019/0156383 | A1* | 5/2019 | Khoo | G06Q 30/0206 |
| 2020/0148069 | A1* | 5/2020 | Heuer | B60L 53/65 |
| 2020/0282859 | A1* | 9/2020 | Shin | G06F 21/30 |
| 2021/0090140 | A1* | 3/2021 | Khoo | B60L 53/305 |
| 2021/0273819 | A1* | 9/2021 | Rueckriemen | H04L 9/3268 |

FOREIGN PATENT DOCUMENTS

| | | | | |
|---|---|---|---|---|
| CN | 105847282 A | * | 8/2016 | ......... G06Q 30/0645 |
| DE | 102017206106 A1 | * | 10/2018 | ............ B60L 53/305 |
| DE | 102017206106 A1 | | 10/2018 | |
| DE | 102017206369 A1 | * | 10/2018 | ............ B60L 53/305 |
| DE | 102017206948 A1 | * | 10/2018 | .............. B60L 53/14 |
| DE | 102017212904 A1 | | 1/2019 | |
| DE | 102017117598 A1 | | 2/2019 | |
| WO | WO-2018188818 A1 | * | 10/2018 | ............ B60L 53/305 |
| WO | 2019141511 A1 | | 7/2019 | |

* cited by examiner

METHOD AND SYSTEM FOR MANAGING AUTHORIZATION CREDENTIALS FOR AN ELECTRICAL CHARGING PROCESS FOR A MOTOR VEHICLE AND SERVER DEVICE

FIELD

The invention relates to a method for activating an electrical charging process, in which electrical energy is to be transferred between an electrically drivable motor vehicle and an electrical charging station. The invention also includes a system by means of which the method can be carried out, and a server device that can be used as part of the system.

BACKGROUND

An electrically drivable motor vehicle, i.e., an electric vehicle or a hybrid vehicle, can be connected to an electrical charging station in order to transfer electrical energy to the energy storage device of the motor vehicle or, conversely, to feed electrical energy from the energy storage device back into an electrical power network. The activation of the charging station for such a charging process (charging or discharging) is dependent on whether a user is registered as a customer with the operator of the charging station. Since a user can only be registered as a customer with all existing charging station operators with great effort, the use of charging stations that are available in an area is accordingly restricted, namely to those charging stations for which the user has customer access. However, this limits the usability of charging stations for an electrically drivable motor vehicle.

It is known from DE 10 2017 117 598 A1 that a motor vehicle can control a payment process itself at a charging station by the motor vehicle operating a token module that is synchronized with a token module of the charging station. While this represents a solution for private vehicles, the problem arises, particularly with rental vehicles, for a user that he can only install a token module, for example a so-called digital wallet or purse, with great effort in the motor vehicle he is renting.

From DE 10 2017 212 904 A1 it is known that an electric vehicle and a power source can be coupled with regard to the handling of a charging process via a smart contract of a blockchain in order to be able to bill for electrical energy drawn from the power source by the electric vehicle. Here, too, the effort arises for a user to prepare his blockchain module to pay for the energy in the case of a rental vehicle.

A system for paying for energy is known from WO 2019/141511 A1, using which a user can activate a charging station by paying via a digital currency. However, this means that a user must make a corresponding booking himself for each charging process. This is cumbersome for several charging processes with the same motor vehicle.

SUMMARY

The invention is based on the object of enabling a user to charge electrical energy at different charging stations (charging and/or discharging), even if he is not using his own motor vehicle in this case.

A method for activating an electrical charging process is provided by the invention. This charging process is to be carried out between an electrically drivable motor vehicle and an electrical charging column. During the charging process, in particular electrical energy is transferred from the charging station to the motor vehicle, but it can additionally or alternatively also include returning (discharging) electrical energy from the motor vehicle to the charging station. By activating the charging process, the energy flow in the charging station is enabled or activated or switched on. The activation of the charging process can be requested by a user who has connected the motor vehicle to the charging station. However, it can also be an autonomously driving vehicle that a user is currently using for himself and that has automatically connected itself to the charging station without the user being there.

In order for the charging process to be activated, it has to be verified by an activation circuit of the charging station that the motor vehicle is allowed to use the charging station. For this purpose, it is provided according to the invention that, by means of an operating device of the user different from the motor vehicle, these certificate data for activating the charging process are stored in a stationary server device external to the motor vehicle. The user therefore uses an operating device independently of the motor vehicle in order to store or generate certificate data in a server device independent of the motor vehicle. A mobile terminal, such as a smartphone or a tablet PC, for example, can be provided as the operating device. The server device can be based on an Internet server or a network of Internet servers. The certificate data can represent, for example, a credit or a contract by which a claim to the charging process is confirmed.

In the server device it is now known that the user has certificate data available which allow the user to claim or use or activate the charging process. The method now enables the user to associate this certificate data with the motor vehicle or to assign it to the motor vehicle so that it can activate the charging process for itself on the basis of the certificate data independently or automatically, i.e., without any further action of the user. For this purpose, the operating device uses a predetermined transfer command that it sends to the server device to transfer the certificate data to a data memory that is assigned to the motor vehicle in the server device. It is therefore now known in the server device that certificate data are available or are usable for the motor vehicle.

This does not yet, however, inform the electronic activation circuit of the charging station. Therefore, before or while the motor vehicle is connected to the charging station for the charging process, a control unit of the motor vehicle sends out access data for accessing the data memory to the activation circuit of the charging station. The motor vehicle therefore uses its control unit to signal access data which specify or signal which data memory in the server device is assigned to the motor vehicle. The motor vehicle itself thus cannot access or handle the actual certificate data. It only signals to the charging station where it can find this possible certificate data in the server device if the user has stored them there. The transmission of the access data from the control unit to the activation circuit can take place in a manner known per se, for example via an electrical infrastructure, for example a charging cable via which the motor vehicle is electrically connected to the charging station. The access data can also be transmitted via radio or optically via a wireless connection. The access data can uniquely identify the data memory in the server device. It can therefore be an identifier of the data memory. One example of such access data is a cryptographic public key of a cryptographic key pair.

At this point in time, the control unit does not need to know whether sufficient certificate data are stored in the data memory that enable the charging process to be activated. Instead, the activation circuit of the charging station receives the access data and uses the received access data to request the certificate data from the data memory of the control unit (i.e., of the motor vehicle) from the server device via an Internet connection.

The activation circuit can now independently inquire of the server device or request from it whether there are certificate data in the data memory of the motor vehicle. Thus, manipulation of the charging station by the control unit of the motor vehicle is excluded. The server device can then signal whether and which certificate data are available in the data memory. Only if the requested certificate data meet a predetermined admissibility criterion is the charging process carried out by the activation circuit in that the activation circuit actuates a switch arrangement of the charging station. Such a switch arrangement can, for example, be a converter circuit for converting a charging voltage of the charging station (for example an AC/DC converter). The switch arrangement is thus only actuated or put into operation if the certificate data meet a predetermined admissibility criterion. The admissibility criterion can, for example, state that certificate data have to be contained in the data memory at all or that the certificate data have to represent a predetermined minimum credit for energy.

The invention has the advantage that a user can use his operating device to equip or prepare a motor vehicle for one or more charging processes with certificate data, regardless of whether it is his own motor vehicle or whether he has just rented it, by storing or entering or transferring these certificate data from his operating device to the data memory of the server device which is assigned to the motor vehicle. Each charging station to which the motor vehicle is connected for a charging process can then receive access data for this data memory from the motor vehicle and automatically check whether the motor vehicle is approved for the charging process at this charging column. This is described or signaled by the certificate data. A user therefore only has to prepare or "fill up" the data memory of the motor vehicle in the server device once by means of an operating device and can then enable the motor vehicle for one or more charging processes (depending on the certificate data used).

The invention also comprises embodiments which result in additional advantages.

In one embodiment, the operating device transfers the certificate data to the data memory in dependence on the operating device receiving a coupling signal which signals that the operating device is being coupled to the control unit of the motor vehicle via a communication channel in a coupling process or is presently coupled. The certificate data are therefore only or always made available to the motor vehicle in its data memory in the server device when the operating device is coupled to the control unit of the motor vehicle via the communication channel. Such a communication channel, which can be recognized and can be signaled by a coupling signal, can, for example, be detected on the basis of a Bluetooth connection between the operating device and the control unit of the motor vehicle or a WLAN connection (WLAN—Wireless Local Area Network) or an NFC connection (NFC—Near Field Communication). If the user carries the operating device with him, for example, and gets into the motor vehicle, this can trigger the coupling process because the operating device is in a receiving range of a communication circuit or a transceiver circuit of the motor vehicle and the communication channel is being established. The operating device can then receive the coupling signal and thus transfer the certificate data to the data memory that is assigned to the motor vehicle in the server device. For this purpose, the operating device can use the above-mentioned transfer command, which can be sent to the server device via an Internet connection, for example. Triggering the transfer of the certificate data by means of a coupling signal results in the advantage that the transfer of the certificate data can be automated by recognizing that the user is presently using the motor vehicle because his operating device has been coupled to the motor vehicle. This means that a user no longer has to carry out manual transfer or manual triggering of the transfer command.

In one embodiment, the operating device makes the certificate data in the data memory (as it is assigned to the motor vehicle in the server device) invalid again in the future during a decoupling process. If the decoupling process is carried out so that the operating device and the vehicle control device are decoupled again, then the certificate data of the user are no longer usable by the motor vehicle for recharging. The decoupling process here means that the operating device is decoupled from the control unit of the motor vehicle, that is to say, for example, the above-mentioned communication channel is interrupted or disconnected. If a user thus gets out of the motor vehicle, for example, this can trigger the decoupling process because, for example, the reception area is left. The operating device then reacts by making the certificate data in the data memory invalid. This means that another user can no longer recharge the motor vehicle using this certificate data at a charging station. This reliably prevents misuse of the certificate data by other users.

In one embodiment, the decoupling process takes place deterministically after a predetermined time span (for example, after a time value in a range of 3 minutes to 1 hour) or in reaction to a predetermined event (for example, a user input or a locking process of the motor vehicle). The time span can be measured from the detection of a successful coupling.

The coupling process can thus provide that certificate data (credit) of the operating device are transferred or rebooked as the certificate data of the motor vehicle. The decoupling process can provide that the certificate data (credit) of the motor vehicle are transmitted or booked in reverse as the certificate data of the operating device.

In order to make the certificate data in the data memory invalid, one embodiment provides that a decoupling signal signals in the operating device that the operating device is being removed from the motor vehicle. This can be detected, for example, from the fact that the communication channel is interrupted or a transmission power of a radio signal by way of which the communication channel is provided is less than a predetermined threshold value. A logoff process, as can be carried out according to a communication protocol via the communication channel, can also be detected and the decoupling signal can then be generated. For the case in which it detects the decoupling signal, the operating device generates a reverse booking command which invalidates the certificate data in the data memory. The operating device signals to the server device by way of the reverse booking command that the certificate data should no longer be available in the data memory of the motor vehicle for the charging process. The server device can then execute a correspondingly provided function, for example delete the certificate data in the data memory or mark it as invalid.

According to one embodiment, the operating device sends the reverse booking command to the server device and upon receipt of the reverse booking command, the server device enters the certificate data by means of a rebooking process in another data memory which is assigned to the operating device. In other words, the certificate data are invalidated in the data memory for the motor vehicle and in return are made available or entered in the data memory for the operating device. The operating device is therefore now again authorized to trigger or carry out a charging process on the basis of the certificate data. The operating device is thus advantageously usable or employable by the user to activate another motor vehicle for the charging process. For this purpose, the user only has to transfer the certificate data to the data memory of this other motor vehicle on the server device again by means of the operating device in the manner described.

If the charging process is not blocked or prevented but actually carried out, it is advantageous if the certificate data for the motor vehicle used for this purpose or on which it is based expire, that is to say multiple charging processes cannot be carried out on the basis of these certificate data. One embodiment provides for this purpose that the certificate data are transferred to a credit memory of an operator of the charging station after the charging process or during the charging process. In other words, the transfer of the certificate data to the credit memory confirms that the operator of the charging station has successfully transferred energy to the motor vehicle in the charging process.

The transfer of the certificate data from the data memory to the credit memory can be problematic here insofar as the point in time of the energy transfer and the point in time of the transfer of the certificate data to the credit memory can have a discrepancy or can be different, and that in the thus resulting intermediate time period, for example, a technical problem can lead to a disruption of the charging process. In order to coordinate the handling of the charging process on the one hand and the transfer of the certificate data on the other hand, one embodiment provides that the certificate data are already transferred to an escrow memory before the charging process, which is accessible neither to the control unit of the motor vehicle nor to the activation circuit of the charging station. During the charging process, operating data which describe at least one electrical operating variable of the charging process are recorded by the charging station and/or the motor vehicle and provided to a monitoring circuit controlling the escrow memory, which after the charging process only transfers the certificate data to the credit memory in the case that the operating data meet a predetermined okay criterion. The at least one operating variable of the charging process can describe, for example, the transferred energy and/or an integrated current flow (that is, an amount of charge, measured, for example, in ampere-hours) for an amount of energy (measured, for example, in watt-hours). The transfer or rebooking of the certificate data can then be controlled by the monitoring circuit in accordance with the operating data. The proportion of the certificate data that is transferred to the credit memory can meet an okay criterion, by means of which a person skilled in the art can configure the monitoring circuit. The monitoring circuit can control or monitor the escrow memory, for example on the basis of a program code, which can be designed as a so-called smart contract, by way of which the transfer or rebooking of the certificate data can be controlled as a function of the operating data. This means that the charging process is billed or rebooked without the influence of a human operator.

In one embodiment, the server device provides the respective data memory (data memory for the motor vehicle, data memory for the operating device, credit memory, escrow memory) in a distributed ledger technology, in particular a blockchain. A blockchain provides for storage in a data structure that inherently contains protection against manipulation by dividing the data stored in the blockchain into blocks that are chained or linked to one another in a known manner using checksums. The transfer of the certificate data to the data memory assigned to the motor vehicle or from the data memory (for example, if the operating device is being removed from the motor vehicle) is then carried out in this case as a transaction in distributed ledger technology or is designed as such a transaction. The use of a distributed ledger technology has the advantage that the transfer of certificate data takes place by way of a transaction or a rebooking, so that it is always clearly established to which of the data memories the certificate data are currently assigned or in which data memory they are to be considered valid.

For so-called non-discriminatory or anonymous charging, i.e., the charging station cannot recognize on the basis of the PK number and/or distributed ledger technology which motor vehicle (VIN number, vehicle identity) and/or which vehicle type is connected, operating data and/or charging data and/or motor vehicle identification data (VIN) are encrypted using the private key belonging to the PK number (public key number) of the motor vehicle, so that these encrypted operating data and/or charging data and/or motor vehicle identification data of the motor vehicle can only be read by decryption or whose information (decrypted content) is accessible Deleting the private key ensures that these blockchain data are anonymized securely, even though the blockchain itself is publicly accessible. The user can delete the private key himself.

In order to carry out the method according to the invention, the invention also provides a system for carrying out a charging process. This is a charging process for electrical energy in a motor vehicle. The system comprises at least one operating device, as can be used by the user to provide the certificate data, at least one motor vehicle that is to be recharged at a charging station, at least one charging station, and the described server device, via which the operating device, motor vehicle, and charging station are linked by means of the certificate data or coordinated. The operating device is configured in the manner described to store certificate data for activating the charging process in the server device and to transfer the certificate data to a data memory that is assigned to the motor vehicle in the server device, i.e., represents a data memory for data of the motor vehicle. The control unit in the motor vehicle is configured, before or while the motor vehicle is connected to the charging station for the charging process, to send out access data for access to the data memory to an activation circuit of the charging station. In the case of distributed ledger technology, the access data can represent a so-called public key, for example, which in distributed ledger technology identifies an account or a wallet of the motor vehicle. The activation circuit of the charging station is configured to receive such access data and, on the basis of the received access data, to request the certificate data of the operating device via an Internet connection at the server device from the data memory of the control unit. The activation circuit therefore checks whether the data memory of the motor vehicle actually contains sufficient or valid access data. Only if the requested certificate data meet a predetermined admissibility criterion does the activation circuit carry out the charging process by activating a switch arrangement of the charging station, i.e., only in this case, for example, a converter circuit for generating a charging voltage in the charging station is activated or operated.

The motor vehicle provided according to the invention is preferably designed as an automobile, in particular as a passenger car or truck, or as a passenger bus or motorcycle.

The invention also comprises combinations of the features of the described embodiments.

BRIEF DESCRIPTION OF THE FIGURES

Exemplary embodiments of the invention are described hereinafter. In the figures.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is intended to comprise combinations of the features of the embodiments other than those shown. Furthermore, the described embodiments can also be supplemented by further features of the invention that have already been described.

In the figures, the same reference numerals designate elements that have the same function.

DETAILED DESCRIPTION

Figure 1:
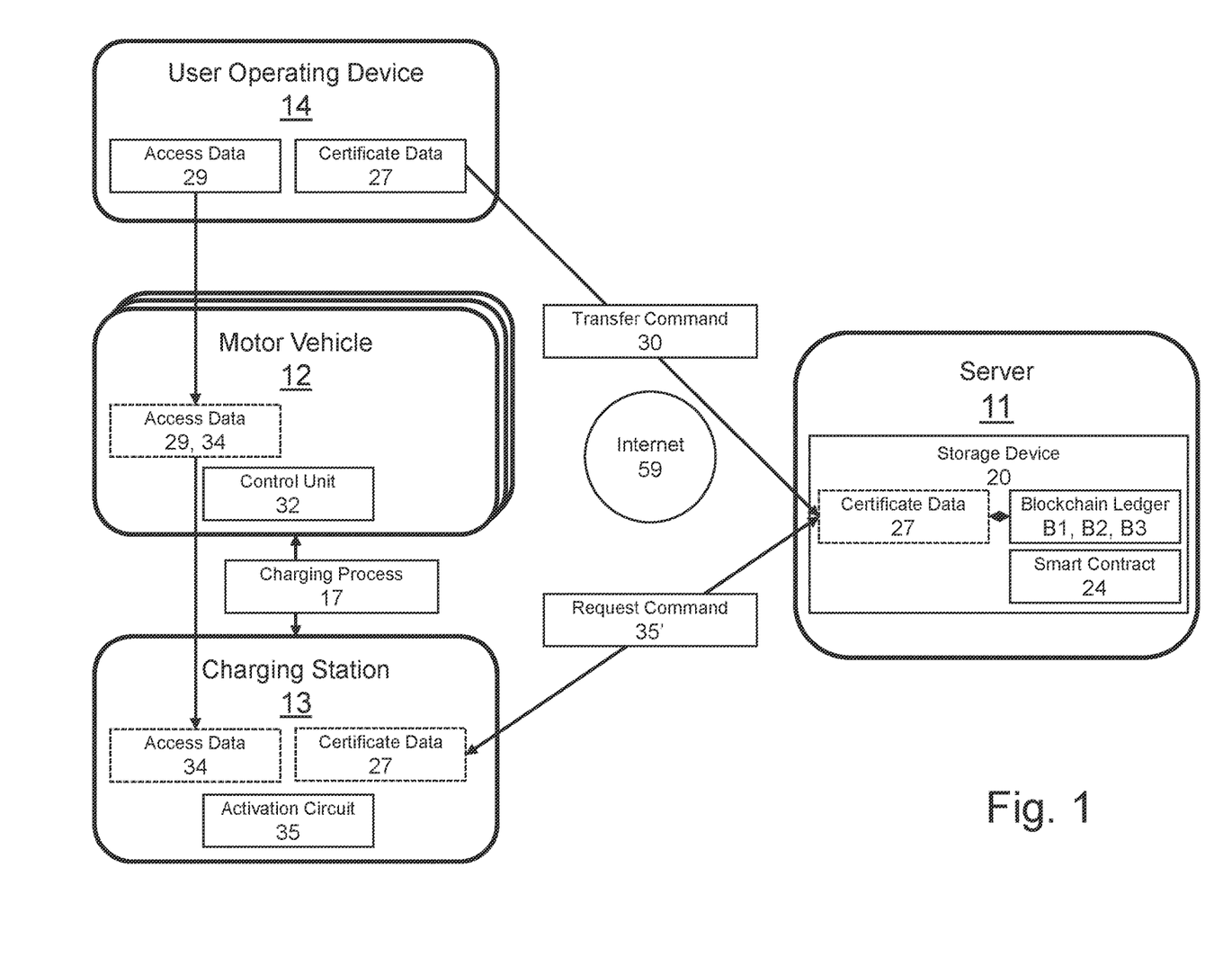
FIG. 1 shows a schematic illustration of an embodiment of the system according to the invention, by which an embodiment of the method according to the invention can be carried out.

FIG. 1 shows a system 10 which can have a server device 11, by means of which operation of one or more motor vehicles 12 can be coordinated with operation of one or more charging stations 13 via one or more operating devices 14. A respective operating device 14 can be used by a user who can use one or more of the motor vehicles 12. The motor vehicles 12 can be private motor vehicles or can belong to a fleet of a company or a vehicle rental company. The server device 11 can ensure that the user can, with little effort, preferably once, upgrade or equip a respective motor vehicle 12 that he would like to use so that this motor vehicle 12 can independently activate and carry out a charging process 17 at a charging station 13, as will be described in more detail below in conjunction with FIG. 2.

The server device 11 can comprise one or more server computers 18, each of which can operate a control module 19 in order to control or activate respective charging processes 17 of the motor vehicles 12 at the charging stations 13 and to take into consideration the specifications of users for this purpose. A control module 19 can be implemented on the basis of program data or program code. A storage device 20 can be implemented by a control module 19 in order to provide a respective data memory for the user 15, the motor vehicles 12, and for a respective operator 21 of the respective charging station 13. By way of example, such a storage device 20 can be formed as a distributed ledger technology for example a blockchain made up of multiple blocks B1, B2, B3 chained to one another, for example via checksums or hash codes. The three blocks B1, B2, B3 shown here by way of example are only exemplary; n blocks can be provided, wherein the number n can also be greater than three. The data stored in the storage device 20 can be processed, for example, by a smart contract 24, the program code of which can be executed by the respective server computer 18. The server computers 18 can exchange the storage device 20 as a data structure with one another, so that all server computers 18 have the same data available.

By way of the charging process 17, a respective motor vehicle 12 receives electrical energy for which the current user of the motor vehicle 12 is supposed to pay. Here, a user would like to ensure that after he has turned in the motor vehicle 12, for example because it is a rental vehicle, he no longer pays for energy that the motor vehicle 12 receives or recharges from a charging station 13 after it has been given to another user. Is thus supposed to be ensured that a payment for electrical energy by the user to an operator is only made for those charging processes 17 that the user has carried out for a motor vehicle 12 used by him.

For this purpose, a user can specify on his operating device 14, for example at an operating interface, that certificate data 27, the credit due to the user or a contract relating to the authorization to use a charging station 13 (e.g., a charging station) in the server device 11, are transferred one of the motor vehicles 12, which will be explained in more detail below. For this purpose, the user can use access data 29, which he can store in the operating device 14, to activate or enable the transfer of the certificate data 27 to the motor vehicle 12. The user 15 can also configure this transfer of the access data at the operating interface to such an extent that the actual provision of the certificate data 27 for a specific motor vehicle 12 takes place automatically by way of a transmission command 30 from the operating device 14 when the operating device 14 detects a coupling process by which the operating device 14 is coupled to a control unit 32 of the motor vehicle 12 in order to form a communication channel between them, for example on the basis of Bluetooth or WLAN.

If a motor vehicle 12 is then to be connected to the charging station 13 for a charging process 17, during this connection process or coupling process, the control unit 32 of the motor vehicle 12 can transmit access data 34 to an activation circuit 35 of the charging station 13, by means of which the activation circuit 35 of the charging station 13 can inquire or request at the server device 11 using a request command 35' whether the motor vehicle 12 is authorized to use the charging station 13, which is confirmed by the certificate data 27. Subsequently, a credit of the operator of the charging station 13 can be compensated for by rebooking, for example, the certificate data 27 to his credit account for the provision or output of the energy to the motor vehicle 12.

FIG. 2 once again illustrates the charging process 17 with the coupling process 33.

Figure 2:
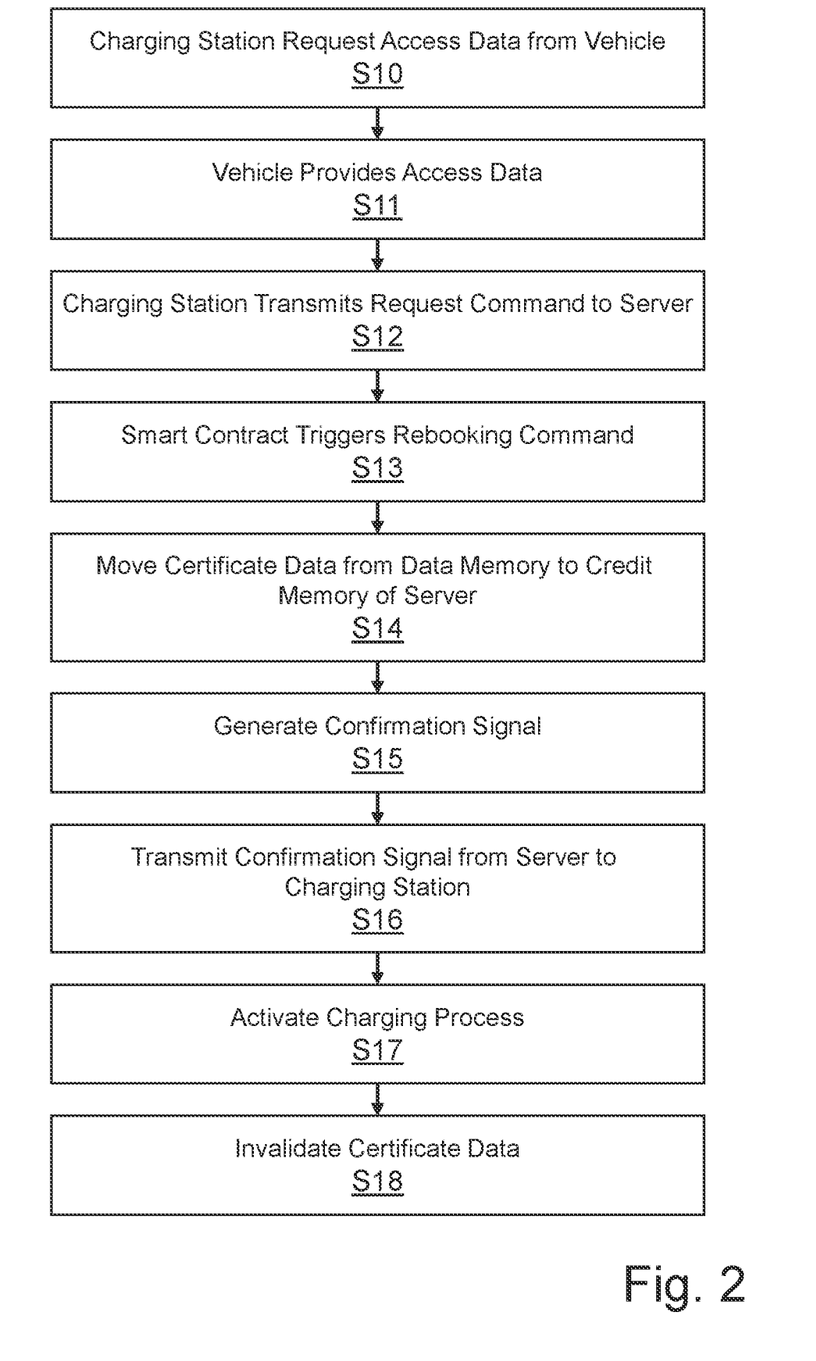
FIG. 2 shows a diagram to illustrate a recharging process.

In a step S10, the charging station 13 can send out a request signal 39 to the control unit 32 via a communication channel, for example for the case that the motor vehicle 12 has been coupled (for example galvanically or inductively) to the charging station 13 for the transfer of energy, by which request signal it is requested that the motor vehicle 12 is to provide access data 34 for accessing or obtaining valid certificate data. If the storage device 20 is a distributed ledger technology 22, the access data can thus comprise, for example, a public key by means of which a data memory 40, which is assigned to the motor vehicle 12, is identified in the distributed ledger technology 22. This assignment can take place in that the access to or the modification of the data memory 40 is only enabled by means of the public key from the access data 34. For this purpose, the data memory 40 can be encrypted by means of a private key, which can be stored in the motor vehicle 12, in particular in its control unit 32. If the control unit 32 provides the access data 34 via the communication channel of the activation circuit 35 in a step S11, the activation circuit 35 can thus send out the described request command 35' to request the valid access data 27 to the server device 11, where it can be processed by the smart contract 24, for example, in a step S12. For example, the activation circuit 35 can also additionally transmit its own access data, for example also a public key, together with the access data 34 in step S12 to the smart contract 24 so that this smart contract rebooks the certificate data 27 from the data memory 40 of the motor vehicle 12 in the storage device 20 to a credit memory 42 of the operator 21 of the charging station 13. For this purpose, the certificate data 27 can be transferred by the smart contract 24 to the credit memory 42 of the operator. For this purpose, the smart contract 24 can trigger in step S13 a rebooking command for the storage device 20, in particular the distributed ledger technology 22. In a step S14, the certificate data 27 can then be transferred from the data memory 40 to the credit memory 42 in the data memory. In a step S15, the successful rebooking can be confirmed by means of a confirmation signal of the activation circuit 35 of the charging column 13, which can be controlled by a backend server optionally via a communication interface in a step S16. It is thus signaled or known in the activation circuit 35 of the charging station 13 by way of the confirmation signal that the connected motor vehicle 12 is authorized by the certificate data 27 to receive energy from the charging station 13. Accordingly, the charging station 13 can then activate in step S17 a converter circuit to begin the charging process 17 by activating a switch 13b. In a step S18, the operating device may generate a reverse booking command which invalidates the certificate data in the data memory.

Figure 3:
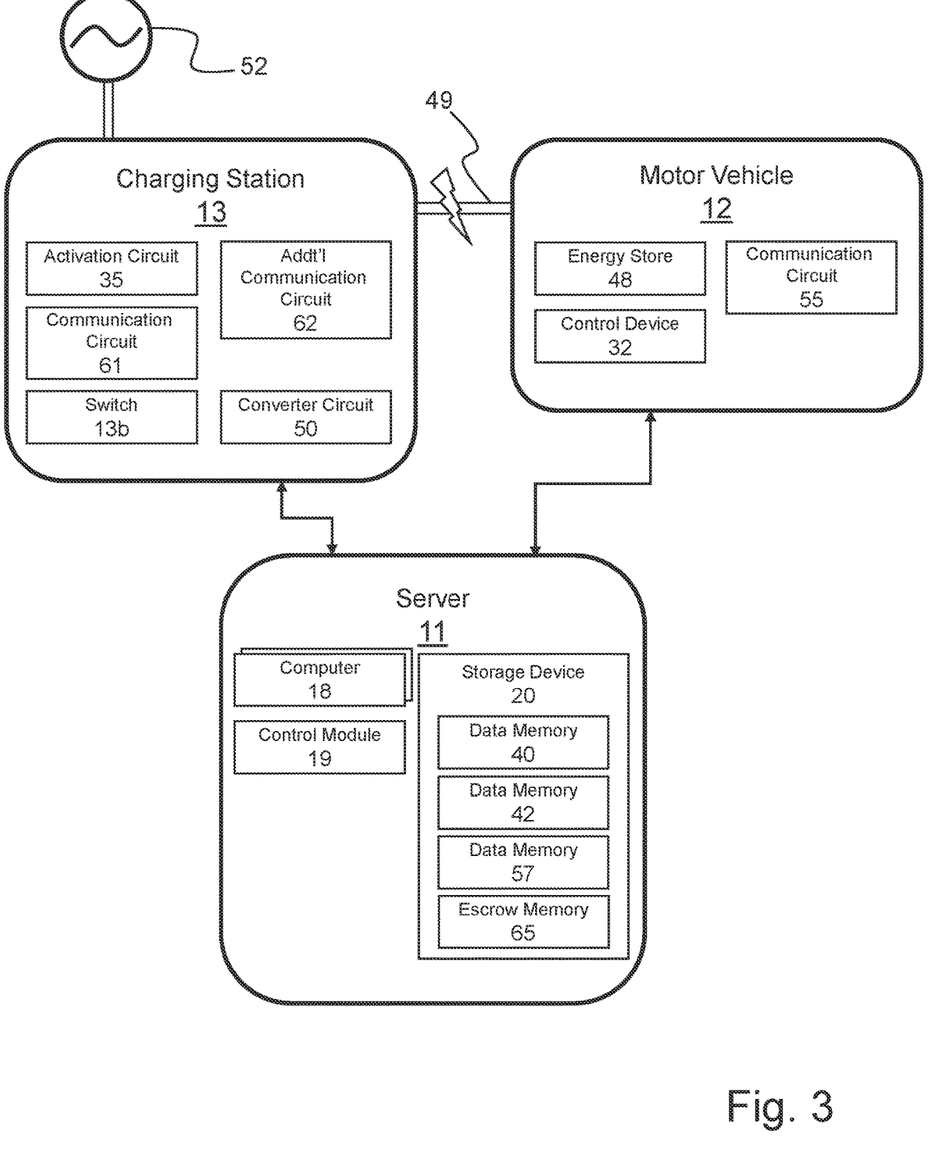
FIG. 3 shows a schematic illustration of a motor vehicle and a charging station and a server device which coordinate a recharging process.

This process is illustrated again in FIG. 3. FIG. 3 illustrates how it can be ensured here that the user 15 only pays for the energy for such a motor vehicle 12 that he is also actually currently using.

FIG. 3 shows a motor vehicle 12 that can be parked at a charging station 13 in order to recharge electrical energy for an electrical energy store 48 of the motor vehicle 12. The energy store 48 can be, for example, a traction battery or a high-voltage battery (high-voltage—electrical voltage greater than 60 volts, in particular greater than 100 volts). The energy store 48 can be designed to operate an electric traction drive of the motor vehicle 12. The motor vehicle 12 can accordingly be an electric vehicle or a hybrid vehicle. The motor vehicle 12 can be coupled to the charging station 13 via an electrical transfer link 49, which can be formed, for example, by a galvanic connection, for example via a cable or by way of an induction coil. In order to transfer the energy, an electrical converter circuit 50 of the charging station 13 has to be activated or enabled by means of an actuation signal. Only in the activated state does the converter circuit 50 convert electrical energy from an electrical supply network 52, that is to say a public power network, in such a way that it is transferred to the motor vehicle 12 via the transfer link 49. The actuation signal can be generated by the described activation circuit 35 of the charging station 13 if it is detected in the activation circuit 35 that the motor vehicle 12 can pay for the energy or is authorized to receive the energy. This can be signaled by the described confirmation signal, which signals that certificate data 27 of a user of the motor vehicle 12 meet an admissibility criterion, can be signaled by the confirmation signal.

The following process can be provided so that the user of the motor vehicle 12 only activates the motor vehicle 12 that he is currently using with his certificate data 27. When the user uses the motor vehicle 12 or gets into the motor vehicle 12, his operating device 14 can establish a communication channel via a communication circuit 55 of the motor vehicle 12 with the control unit 32 of the motor vehicle 12. The communication channel can be based on a Bluetooth technology or WLAN technology or NFC technology in the manner described. Furthermore, manual input of the motor vehicle identification number or a code attached to the motor vehicle is possible via the operating device 14.

Once the communication channel has been established, this can be signaled by a coupling signal, which can be received by the operating device 14. Depending on the coupling signal, the operating device 14 can send a transfer signal or a transfer command 30 for transferring the certificate data 27 from a data memory 57, which is assigned to the user, to the data memory 40, for which an assignment to the motor vehicle 12, in particular the control unit 32 of the motor vehicle 12, is present. The transfer command 30 can be transmitted to the server device 11, which can be provided on the Internet 59 for this purpose. The transfer command 30 can correspondingly be transmitted via an Internet connection. Once the certificate data 27 have been transferred to the data memory 40, they are available to the control unit 32 to activate the charging process 17. In the manner described in conjunction with FIG. 2, the activation circuit 35 can now send out the request signal for the certificate data 27 via the communication channel and the control device 32 can then provide the access data 34 to the activation circuit 35. The transmission can take place via a communication circuit of the activation circuit 35. The activation circuit 35 can request the certificate data 27 via a request signal via an additional communication circuit 62 or the same communication circuit 61 from the server device 11 via an internet connection. This can be, for example, a booking process by which the certificate data 27 are to be transferred to the credit memory 42. In each case, transfer means that the certificate data 27 then become invalid or are deleted in the data memory in which they were previously located. The transmission can take place in conjunction with a distributed ledger technology 22 as a so-called transaction or rebooking. As an alternative to direct transfer, an escrow memory 65 can also initially temporarily store the access data 27 so that they are not available to either the control unit 32 or the activation circuit 35. This has already been described.

If the transaction described in FIG. 2 shows that certificate data present as valid in the sense of the admissibility criterion are available in the data memory 40, the confirmation signal can be signaled to the activation circuit 35. The activation circuit 35 can then generate the abovementioned actuation signal, whereupon the converter circuit 50 begins operation or provides or transfers the energy for the energy store 48. This can be done for one or more charging processes 17. If the user 15 leaves the motor vehicle 12 with his operating device 14, a decoupling process takes place in order to disconnect or separate the communication channel. This can be signaled to the operating device 14 by a decoupling signal, whereupon the operating device 14 can send out a rebooking command via the Internet connection to the server device 11. The certificate data 27 or remaining certificate data 27 can then be transferred or booked as remaining credit or remaining certificate data from the data memory 40 back to the data memory 57 of the user 15. These remaining certificate data are therefore no longer available in the data memory 40 for the control device 32 for triggering or activating a further charging process 17. The user can thus leave the motor vehicle with the operating device 14 and his certificate data can no longer be used from the motor vehicle to activate a further charging process. The user can get into another motor vehicle with his operating device 14 and then upgrade or equip it in the manner described for activating a further charging process 17.

If the described transfers of the certificate data 27 between the data memories 57, 40, 42 are carried out in a distributed ledger technology 22, then it can in each case be a transaction between corresponding credits on credit accounts and a credit account provided for the control unit 32 of the motor vehicle 12.

Overall, the examples show how a decentralized charging system or a decentralized charging platform for electric vehicles can be provided.

The invention claimed is:

1. A method for activating an electrical charging process carried out between an electrically drivable motor vehicle and an electrical charging station, comprising:
    generating, using an operating device of a user, certificate data for activating the charging process,
    transferring the certificate data to an external server device for storage in response to a predetermined transfer command,
    transferring access data from the operating device to the motor vehicle and storing the access data in the motor vehicle, the access data comprising information describing where in the external server device the certificate data is stored,
    transferring, from the motor vehicle to the charging station and before and/or while the motor vehicle is connected to the charging station for the charging process, the access data,
    retrieving, using the access data and by the charging station, the certificate data from the external server device via an internet connection, and
    activating, by the charging station, the charging process by actuating a switch arrangement if the certificate data so retrieved satisfies an admissibility criterion,
    wherein the operating device, the external server device, and the motor vehicle are distinct from one another.

2. The method according to claim 1, wherein the predetermined transfer command transfers the certificate data in response to the operating device establishing a communicative coupling with a control unit of the motor vehicle.

3. The method according to claim 1, further comprising invalidating the certificate data, by the operating device, in response to a decoupling of a communicative connection between the operating device and the motor vehicle.

4. The method according to claim 3, wherein the decoupling occurs automatically after a predetermined time span.

5. The method according to claim 3, wherein the decoupling occurs automatically after a predetermined event.

6. The method according to claim 5, wherein the predetermined event is a locking of the motor vehicle by the user.

7. The method according to claim 1, wherein the certificate data is invalidated upon a transfer of new certificate data from the operating device to the external server device.

8. The method according to claim 1, wherein retrieval of the certificate data comprises:
    placing the certificate data in an escrow memory which is accessible to neither the motor vehicle nor the charging station,
    transmitting operating data comprising at least one electrical operating parameter of the charging process from the charging station to a monitoring circuit which manages the escrow memory, and
    releasing the certificate data to the charging station when the operating data so transmitted satisfies an acceptance criterion.

9. A method according to claim 1, wherein the certificate data is managed in the external server device using a blockchain ledger and is registered in the blockchain ledger as transactions.

10. The method according to claim 9, wherein identifying information relating to the motor vehicle and/or the charging process is encrypted within the blockchain ledger.

11. A system for carrying out a charging process of electrical energy in a motor vehicle comprising an operating device, the motor vehicle, and an external server device,
    wherein the system is configured to carry out the method according to claim 1.

12. The system according to claim 11, wherein the external server device is configured to keep ready storage space for certificate data from the operating device.

13. The method according to claim 1, wherein the certificate data is invalidated upon completion of the charging process.

* * * * *